United States Patent
Gao et al.

(10) Patent No.: US 10,779,329 B2
(45) Date of Patent: Sep. 15, 2020

(54) RANDOM ACCESS RESPONSE TRANSMISSION METHOD AND DEVICE

(71) Applicant: CHINA ACADEMY OF TELECOMMUNICATIONS TECHNOLOGY, Beijing (CN)

(72) Inventors: Xuejuan Gao, Beijing (CN); Weijie Xu, Beijing (CN); Yanping Xing, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/752,889

(22) PCT Filed: Aug. 12, 2016

(86) PCT No.: PCT/CN2016/094974
§ 371 (c)(1),
(2) Date: Feb. 14, 2018

(87) PCT Pub. No.: WO2017/028756
PCT Pub. Date: Feb. 23, 2017

(65) Prior Publication Data
US 2018/0249508 A1 Aug. 30, 2018

(30) Foreign Application Priority Data
Aug. 14, 2015 (CN) .......................... 2015 1 0502962

(51) Int. Cl.
*H04W 74/08* (2009.01)
*H04L 27/26* (2006.01)
(Continued)

(52) U.S. Cl.
CPC ......... *H04W 74/0833* (2013.01); *H04L 5/006* (2013.01); *H04L 5/0053* (2013.01);
(Continued)

(58) Field of Classification Search
CPC ... H04L 5/0053; H04L 5/006; H04L 27/2613; H04W 52/0216; H04W 74/006; H04W 72/042; H04W 74/0833
See application file for complete search history.

(56) References Cited

U.S. PATENT DOCUMENTS

2016/0192333 A1* 6/2016 Wang ...................... H04W 4/70
370/329
2016/0302080 A1* 10/2016 Hwang .................... H04W 4/70
(Continued)

FOREIGN PATENT DOCUMENTS

CN 104184548 A 12/2014
CN 104254135 A 12/2014
(Continued)

OTHER PUBLICATIONS

European Patent Office—Extended European Search Report dated Jul. 19, 2018, for related European Patent Application No. 16836620.1 (15 pgs).
(Continued)

*Primary Examiner* — Yemane Mesfin
*Assistant Examiner* — Henry Baron
(74) *Attorney, Agent, or Firm* — Womble Bond Dickinson (US) LLP

(57) ABSTRACT

Disclosed in the present application are a random access response (RAR) transmission method and device for ensuring independent transmission of RARs having different coverage enhancement levels, reducing a blind test of a physical downlink control channel performed by a terminal, and saving power consumption of the terminal. The present application provides an RAR transmission method, comprising: determining, by a network side and at least according to coverage enhancement levels corresponding to physical downlink control channels, frequency domain resources of the physical downlink control channels, wherein the
(Continued)

The network side determines frequency resources of physical downlink control channels at least according to coverage enhancement levels corresponding to the physical downlink control channels, where the frequency resources of the physical downlink control channels with different coverage enhancement levels are configured independently — S101

The network side transmits the physical downlink control channels over the frequency resources of the physical downlink control channels — S102 frequency domain resources of the physical downlink control channels having different coverage enhancement levels are independently configured; and transmitting, by the network side, the physical downlink control channels on the frequency domain resources of the physical downlink control channels.

28 Claims, 5 Drawing Sheets

(51) Int. Cl.
    *H04W 74/00*     (2009.01)
    *H04W 72/04*     (2009.01)
    *H04L 5/00*     (2006.01)
    *H04W 52/02*     (2009.01)
    *H04W 84/04*     (2009.01)

(52) U.S. Cl.
    CPC ..... *H04L 27/2613* (2013.01); *H04W 52/0216* (2013.01); *H04W 72/042* (2013.01); *H04W 74/006* (2013.01); *H04L 5/0007* (2013.01); *H04L 5/0094* (2013.01); *H04W 52/0241* (2013.01); *H04W 84/045* (2013.01); *Y02D 70/00* (2018.01); *Y02D 70/1262* (2018.01); *Y02D 70/21* (2018.01)

(56) References Cited

U.S. PATENT DOCUMENTS

| | | | |
|---|---|---|---|
| 2018/0176947 A1* | 6/2018 | Yu | H04W 74/08 |
| 2018/0249440 A1* | 8/2018 | Zhang | H04W 68/02 |

FOREIGN PATENT DOCUMENTS

| | | |
|---|---|---|
| CN | 104348580 A | 2/2015 |
| WO | WO 2015/012666 A1 | 1/2015 |
| WO | 2015116732 A1 | 8/2015 |
| WO | WO 2015117283 A1 | 8/2015 |
| WO | WO 2016/170430 A1 | 10/2016 |
| WO | WO 2017/011093 A1 | 1/2017 |
| WO | 2015012664 A1 | 1/2019 |

OTHER PUBLICATIONS

Ericsson, "Random Access for Rel-13 low complexity and coverage enhanced EUs," 3GPP Draft; R2-152649, 3$^{rd}$ Generation Partnership Project (3GPP), Mobile Competence Centre; 650, Route des Lucioles, F-06921 Sophi, vol. RAN WG2, No. Fukuoka, JP (May 25, 2015-May 29, 2015) May 24, 2015 (8 pgs).

NEC, "RAR and Paging Transmission for Rel-13 MTC," 3GPP Draft; R1-152676, 3$^{rd}$ Generation Partnership Project (3GPP), Mobile Competence Centre; 650, Route des Lucioles, F-06921 Sophi, vol. RAN WG1, No. Fukuoka, JP (May 25, 2015-May 29, 2015) May 24, 2015 (6 pgs).

Intel Corporation, "RAR Transmission for MTC," 3GPP Draft; R1-151433, 3$^{rd}$ Generation Partnership Project (3GPP), Mobile Competence Centre; 650, Route des Lucioles, F-06921 Sophia-Antipolis Cedex, vol. RAN WG1, No. Belgrade, Serbia (Apr. 20, 2015-Apr. 24, 2015) Apr. 19, 2015 (6 pgs).

Huawei et al., "RAR Transmission for MTC UEs," 3GPP Draft, R1-150065, 3$^{rd}$ Generation Partnership Project (3GPP), Mobile Competence Centre; 650, Route des Lucioles, F-06921 Sophia-Antipolis Cedex, vol. RAN WG1, No. Athens, Greece (Feb. 9, 2015-Feb. 13, 2015) Feb. 8, 2015 (4 pgs).

The first Office Action of Chinese Patent Application No. 201510502962.1 dated Jan. 2, 2019, 6 pages.

The first Office Action of Japanese Patent Application No. 2018526988 dated Dec. 3, 2018, 3 pages.

The second Office Action of Japanese Patent Application No. 2018526988 dated May 7, 2019, 4 pages.

Ericson, 3GPP TSG-RAN WG2 #89; Random Access Procedure for Low Complexity and Coverage Enhanced UE, 7 pages.

State IP Office of the P.R. China—International Search Report of the International Searching Authority, with an English translation of the International Search Report, dated Nov. 1, 2016 for International Application No. PCT/CN2016/094974 (5 pgs).

State IP Office of the P.R. China—Written Opinion of the International Searching Authority dated Nov. 1, 2016 for International Application No. PCT/CN2016/094974 (3 pgs).

LG Electronics, "Further Consideration points for provision of MTC UEs," 3GPP TSG RAN WG1 #73, May 20-24, 2013, RI-132234 (3 pgs).

\* cited by examiner

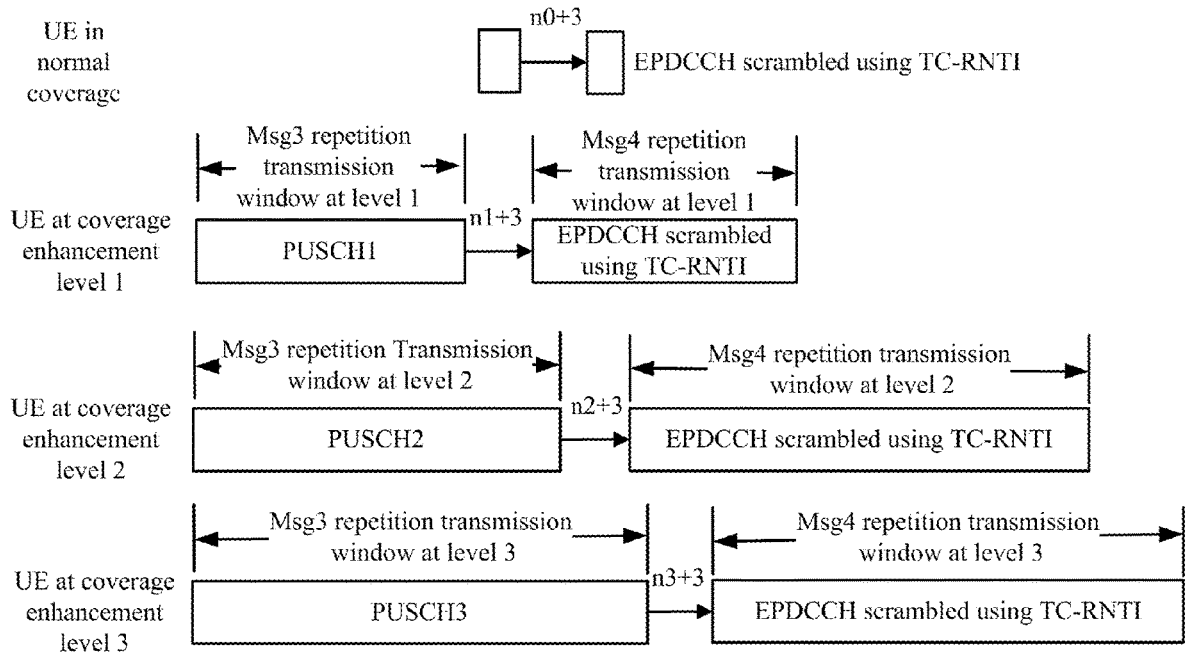

Fig.5

The network side determines frequency resources of physical downlink control channels at least according to coverage enhancement levels corresponding to the physical downlink control channels, where the frequency resources of the physical downlink control channels with different coverage enhancement levels are configured independently — S101

The network side transmits the physical downlink control channels over the frequency resources of the physical downlink control channels — S102

Fig.6

RANDOM ACCESS RESPONSE TRANSMISSION METHOD AND DEVICE

CROSS-REFERENCE TO RELATED APPLICATIONS

This patent application is a U.S. National Phase application under 35 U.S.C. § 371 of International Application No. PCT/CN2016/094974, filed on 12 Aug. 2016, entitled RANDOM ACCESS RESPONSE TRANSMISSION METHOD AND DEVICE, which claims priority from Chinese Patent Application No. CN 20150502962.1, filed with the Chinese Patent Office on Aug. 14, 2015 and entitled "A method and apparatus for transmitting a random access response", the content of which was incorporated by reference in its entirety.

FIELD

The present disclosure relates to the field of communications, and particularly to a method and apparatus for transmitting a random access response.

BACKGROUND

In a contention based random access, an evolved Node B (eNB) does not allocate any dedicated resource for a User Equipment (UE), and a random access procedure is initiated randomly by the UE on its own initiative. The contention based random access is applicable to all of the five scenarios: for the scenarios of Radio Resource Control (RRC) connection establishment, RRC connection reestablishment and uplink data arriving, the random access is initiated by the UE on its own initiative, and the eNB does not have any priori information; and for the scenarios of a handover and downlink data arriving, the UE is indicated by the eNB to initiate the random access. Generally the eNB preferentially selects a non-contention based random access, and only if resources are insufficient to be allocated for the non-contention based random access, then the eNB may indicate the UE to initiate a contention based random access. The contention based random access is generally made in four steps as illustrated in FIG. 1, where each step is represented as a message, and these four steps are represented as Msg1 to Msg4 in the related standards.

(1) The Msg1 relates to a preamble sequence.

This message is an uplink message transmitted by the UE and received by the eNB, and it is transmitted by being carried in a Physical Random Access Channel (PRACH). For a contention based random access, the preamble sequence transmitted by the UE is one selected randomly in a specific set of preambles, and there are different identifies, i.e., preamble indexes, for different preamble sequences.

(2) The Msg2 relates to a Random Access Response (RAR).

This message is a downlink message transmitted by the eNB and received by the UE.

The Msg2 is a response of the eNB to the random access initiated by the UE upon reception of the Msg1, and shall be transmitted in a random access response window. The random access response window starts at the first available downlink sub-frame starting with the sub-frame n+3, where n is the number of the last sub-frame for transmitting a preamble, and the length of the random access response window ranges from 2 to 10 ms, and is particularly specified by the eNB in a system message.

The Msg2 is carried in a Downlink Shared Channel (DL-SCH) defined at the Media Access Control (MAC) layer, and corresponds to a Physical Downlink Shared Channel (PDSCH) at the physical layer. One Msg2 can respond to random access requests of a plurality of UEs, that is, it can carry RARs for the plurality of UEs, so there is no Hybrid Automatic Repeat Request (HARM) procedure for the Msg2, that is, there is no feedback and repetition transmission procedure for the Msg2.

The eNB schedules the Msg2 over a Physical Downlink Control Channel (PDCCH) scrambled using a Random Access Radio Network Temporary Identifier (RA-RNTI) and transmitted in a common search space, where the RA-RNTI is determined by the time-frequency resource position of a PRACH over which the Msg1 is transmitted. The UEs using the same PRACH time-frequency resource can get the same RA-RNTI from the calculation, and their RAR information is packaged into the same RAR message and transmitted, where the RAR message is carried in a downlink shared channel scheduled by the PDCCH scrambled using the RA-RNTI, and the downlink shared channel is also scrambled using the RA-RNTI.

The Msg2 includes a back-off parameter, the identification information of the preamble sequence corresponding to the Msg1, an uplink transmission Timing Advance (TA), an uplink (UL) grant (also referred to as an RAR grant at the physical layer) of the Msg3 and a Temporary Cell-Radio Network Temporary Identifier (TC-RNTI), where the back-off parameter indicates an average delay at which the UE initiates the next random access if the current random access fails.

The UE identifies the RAR message carrying the RAR of the UE (i.e., the Msg2 transmitted in the DL-SCH), using the RA-RNTI determined by the PRACH time-frequency resource over which the UE transmits the preamble sequence in the Msg1, and determines the RAR transmitted to the UE in the RAR message according to the identification information of the preamble sequence transmitted by the UE in the Msg1. If the UE does not receive the Msg2 correctly, then the UE may determine a delay for initiating the next random access according to the delay constraint in the back-off parameter, and further select a random access resource and initiate the next random access. After the largest number of random accesses is reached, the MAC layer of the UE reports a random access failure to the RRC layer to trigger a Radio Link Failure (RLF) procedure.

(3) The Msg3 relates to initial scheduling of uplink transmission.

This message is an uplink message transmitted by the UE and received by the eNB.

The UE performs uplink transmission over an uplink resource indicated by the UL grant (i.e., the RAR grant) included in the obtained RAR of the UE upon reception of the Msg2, that is, the UE transmits a Physical Uplink Shared Channel (PUSCH) according to scheduling information in the RAR grant of the UE, where the PUSCH corresponds to an Uplink Shared Channel (UL-SCH) at the MAC layer. HARQ mechanism is used for Msg3, and at least 56 bits can be transmitted over the uplink resource of Msg3.

Initial transmission of the Msg3 is the only uplink transmission scheduled dynamically at the MAC layer, and needs to be processed at the MAC layer, so there is an interval of at least 6 ms between the Msg3 and the Msg2. All of other repetition transmissions of the Msg3 are scheduled by a PDCCH, which is transmitted in a common search space and scrambled using the TC-RNTI.

(4) The Msg4 relates to contention resolution.

This message is a downlink message transmitted by the eNB and received by the UE.

The eNB and the UE complete the final contention resolution via the Msg4 (the contention arises from different UEs selecting the same preamble sequence and the same PRACH time-frequency resource to transmit the Msg1). The contents of the Msg4 correspond to the contents of the Msg3. The Msg4 is carried in a DL-SCH defined at the MAC layer, and corresponds to a PDSCH at the physical layer. One Msg4 can only respond to contention resolution messages of a set of contending UEs (actually only one of the UEs succeeds). A downlink control channel carrying scheduling information of the Msg4 is transmitted in a UE-specific search space and scrambled using the TC-RNTI or the C-RNTI, and which type of RNTI is used for scrambling is particularly dependent upon the trigger reason and scenario of the contention based access. The HARQ mechanism is also applicable to the Msg4, but only the UE decoding the Msg4 successfully and completing the contention resolution can feed back Acknowledgement (ACK) information; otherwise, no feedback is transmitted.

The UE starts a contention resolution timer (mac-ContentionResolutionTimer) after transmitting the Msg3, and restarts the contention resolution timer each time the Msg3 is retransmitted. If the contention resolution has not been completed after the contention resolution timer expires, then a failure of contention resolution may be judged. If there is a failure of contention resolution, then the UE may operate in a similar way to a failure of receiving the Msg2, where the UE determines a delay for initiating the next random access according to the delay constraint in the back-off parameter, and further selects a random access resource and initiates the next random access. After the largest number of random accesses is reached, the MAC layer of the UE reports a random access failure to the RRC layer to trigger an RLF procedure.

As the internet of things is emerging, a support of Machine Type Communication (MTC) in a Long Term Evolution (LTE) system has been increasingly recognized. An enhanced physical layer project for MTC has been set up in the $3^{rd}$ Generation partnership Project (3GPP) Release 13. An MTC device (or an MTC terminal) may have a part of various Machine to Machine (M2M) communication characteristics, e.g., low mobility, a small amount of data to be transmitted, insensitivity to a communication delay, extremely low power consumption as required, and other characteristics, where in order to lower a cost of the MTC terminal, a type of terminal supporting only a 1.4 MHz radio frequency bandwidth in the uplink and the downlink will be newly defined.

In the existing networks, the operators have identified that for a terminal operating in some scenario, e.g., a terminal operating underground, in a shopping mall, or at a corner of a building, a radio signal is seriously shielded, and the signal is greatly attenuated, so the terminal cannot communicate with the network, but if a coverage area of the network is extended in such a scenario, then a cost of deploying the network will be greatly increased. Some test has showed that the existing coverage area needs to be enhanced to some extent. A feasible practice to enhance the coverage area is to apply repetition transmission or other similar technologies to the existing channels, and theoretically tens or hundreds of repetition transmission can be performed over the existing physical channels for some coverage gain.

Coverage enhancement levels of UEs need to be distinguished from each other in an MTC system by time and frequency resources and preamble sequences used for PRACH access. No repetition transmission is required for a normal coverage mode (the coverage enhancement level 0). There are different start instances of time of repetition transmission and different numbers of repetition transmissions for the PRACHs between the different coverage enhancement levels. There are also different start instances of time of repetition transmission and different numbers of repetition transmissions for the downlink control channels, scrambled using the RA-RNTIs, scheduling the random access responses in the Msg2 procedure, so the downlink control channels, scrambled using the RA-RNTIs, corresponding to the UEs with the different coverage enhancement levels may be partially overlapped on transmission times during the repetition transmission. If they are transmitted as in the prior art, then resource collision may occur, so that some UE has no resource to transmit its downlink control channel scrambled using the RA-RNTI, and thus cannot receive any random access response. The UE needs to obtain its scheduling signaling by detecting different downlink control channel candidates blindly, thus resulting in some power waste. At present, there has been absent a specific solution about how to avoid resource collision between the downlink control channels, scrambled using the RA-RNTIs, corresponding to the different coverage enhancement levels. Alike the downlink control channels, scrambled using the TC-RNTI, scheduling the Msg4 may also partially overlap in the Msg4 procedure, and if they are transmitted as in the prior art, then resource collision may occur. The downlink control channel can be transmitted in the UE-specific search space in the prior art, but configuration information of the specific search space is unavailable for an initial random access in MTC, so that some UE has no resource to transmit its downlink control channel scrambled using the TC-RNTI, and thus cannot receive any contention resolution message.

SUMMARY

Embodiments of the disclosure provide a method and apparatus for transmitting a random access response so as to enable random access responses of different coverage enhancement levels to be transmitted independently, to thereby reduce the number of blind detections by a UE on physical downlink control channels, and save power consumption of the UE.

An embodiment of the disclosure provides a method for transmitting a random access response at the network side, the method including: determining, by the network side, frequency resources of physical downlink control channels at least according to coverage enhancement levels corresponding to the physical downlink control channels, wherein the frequency resources of the physical downlink control channels with different coverage enhancement levels are configured independently; and transmitting, by the network side, the physical downlink control channels over the frequency resources of the physical downlink control channels.

With this method, the network side determines the frequency resources of the physical downlink control channels at least according to the coverage enhancement levels corresponding to the physical downlink control channels, wherein the frequency resources of the physical downlink control channels with the different coverage enhancement levels are configured independently; and the network side transmits the physical downlink control channels over the frequency resources of the physical downlink control channels, so that random access responses at the different coverage enhancement levels are transmitted independently to thereby reduce the number of blind detections by a UE on the physical downlink control channels, and save power consumption of the UE.

Optionally before the network side determines the frequency resources of the physical downlink control channels at least according to the coverage enhancement levels corresponding to the physical downlink control channels, the method further includes: determining, by the network side, the frequency resources of the physical downlink control channels with the different coverage enhancement levels respectively, and notifying a UE independently of the frequency resources of the physical downlink control channels with the different coverage enhancement levels.

Optionally if a Physical Random Access Channel (PRACH) corresponding to the coverage enhancement level has a plurality of available frequency resources in the same sub-frame, then the network side further determines a frequency resource of the physical downlink control channel according to a frequency resource for transmitting the PRACH, wherein the frequency resources of the physical downlink control channel, corresponding to the different PRACH frequency resources of the PRACH in the same sub-frame are configured independently. Stated otherwise, at this time, the frequency resource of the physical downlink control channel needs to be determined according to both the coverage enhancement level corresponding to the physical downlink control channel and the frequency resource for transmitting the PRACH, where the frequency resources of the physical downlink control channels with the different coverage enhancement levels are configured independently, and the frequency resources of the physical downlink control channel, corresponding to the different PRACH frequency resources of the PRACH corresponding to the same coverage enhancement level in the same sub-frame are configured independently.

Optionally before the network side determines the frequency resources of the physical downlink control channels, the method further includes: for each coverage enhancement level, determining, by the network side, frequency resources of the physical downlink control channel, corresponding to different PRACH frequency resources of a PRACH corresponding to the coverage enhancement level in the same sub-frame, and notifying the UE independently of the frequency resources of the physical downlink control channel, corresponding to the different PRACH frequency resources of the PRACH corresponding to the coverage enhancement level in the same sub-frame.

Optionally the UE is notified independently of the frequency resources of the physical downlink control channel via system information.

Optionally the coverage enhancement levels each are represented as a number of dBs of coverage enhancement and/or a number of repetition transmissions, wherein the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the coverage enhancement levels above can further correspond to PRACH resource sets, where each PRACH resource set corresponds to one of the coverage enhancement levels, and the PRACH resource set includes a set of PRACH time-frequency resources and preambles, so the coverage enhancement levels can be replaced with their PRACH resource sets in the embodiments of the disclosure, and the same will apply below, so a repeated description thereof will be omitted.

Optionally transmitting, by the network side, the physical downlink control channels over the frequency resources of the physical downlink control channels includes: transmitting, by the network side, the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include: information about narrow bands in which the physical downlink control channels are transmitted, and/or information about indices of Enhanced Control Channel Elements (ECCEs) in which the physical downlink control channels are transmitted; or a common search space where the physical downlink control channels are transmitted. The common search space is represented as a narrow band, or a part of PRBs in a narrow band. State otherwise, the common search space can be configured particularly by configuring a narrow band index and/or indices of the PRBs directly, and can even be configured in a smaller unit, e.g., of ECCEs, etc., and the same will apply below, so a repeated description thereof will be omitted.

An embodiment of the disclosure provides a method for transmitting a random access response, the method including: determining, by a UE, frequency resources of physical downlink control channels at least according to coverage enhancement levels corresponding to the physical downlink control channels, wherein the frequency resources of the physical downlink control channels with different coverage enhancement levels are configured independently; and receiving, by the UE, the physical downlink control channels over the frequency resources of the physical downlink control channels.

Optionally before the UE determines the frequency resources of the physical downlink control channels at least according to the coverage enhancement levels corresponding to the physical downlink control channels, the method further includes: obtaining configuration information indicating the frequency resources of the physical downlink control channels with the different coverage enhancement levels independently, and obtaining the frequency resources of the physical downlink control channels with the different coverage enhancement levels according to the configuration information.

Optionally if a PRACH corresponding to the coverage enhancement level has a plurality of available frequency resources in the same sub-frame, then the UE further determines a frequency resource of the physical downlink control channel according to a frequency resource for transmitting the PRACH of the UE, wherein the frequency resources of the physical downlink control channel, corresponding to the different PRACH frequency resources of the PRACH corresponding to the coverage enhancement level in the same sub-frame are configured independently. Stated otherwise, at this time, the frequency resource of the physical downlink control channel needs to be determined according to both the coverage enhancement level corresponding to the physical downlink control channel and the frequency resource for transmitting the PRACH, where the frequency resources of the physical downlink control channels with the different coverage enhancement levels are configured independently, and the frequency resources of the physical downlink control channel, corresponding to the different PRACH frequency resources of the PRACH corresponding to the same coverage enhancement level in the same sub-frame are configured independently.

Optionally before the UE determines the frequency resource of the physical downlink control channel according to the frequency resource for transmitting the PRACH of the UE, the method further includes: obtaining configuration information indicating the frequency resources of the physical downlink control channel, corresponding to the different PRACH frequency resources of the PRACH corresponding to each coverage enhancement level in the same sub-frame independently, and obtaining the frequency resources of the physical downlink control channel, corresponding to the different PRACH frequency resources of the PRACH corresponding to each coverage enhancement level in the same sub-frame according to the configuration information.

Optionally the configuration information indicating the frequency resources of the physical downlink control channel is obtained via system information.

Optionally the coverage enhancement levels each are represented as a number of dBs of coverage enhancement and/or a number of repetition transmissions, wherein the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

It shall be further noted that the coverage enhancement levels above can further correspond to PRACH resource sets, where each PRACH resource set corresponds to one of the coverage enhancement levels, and the PRACH resource set includes a set of PRACH time-frequency resources and preambles, so the coverage enhancement levels can be replaced with their PRACH resource sets in the embodiments of the disclosure, and the same will apply below, so a repeated description thereof will be omitted.

Optionally receiving, by the UE, the physical downlink control channels over the frequency resources of the physical downlink control channels includes: receiving, by the UE, the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include: information about narrow bands in which the physical downlink control channels are transmitted, and/or information about indices of Enhanced Control Channel Elements (ECCEs) in which the physical downlink control channels are transmitted; or a common search space where the physical downlink control channels are transmitted. The common search space is represented as a narrow band, or a part of PRBs in a narrow band. State otherwise, the common search space can be configured particularly by configuring a narrow band index, and/or indices of the PRBs directly, and can even be configured in a smaller unit, e.g., of ECCEs, etc., and the same will apply below, so a repeated description thereof will be omitted.

An embodiment of the disclosure provides an apparatus for transmitting a random access response at the network side, the apparatus including: a frequency resource determining unit configured to determine frequency resources of physical downlink control channels at least according to coverage enhancement levels corresponding to the physical downlink control channels, wherein the frequency resources of the physical downlink control channels with different coverage enhancement levels are configured independently; and a transmitting unit configured to transmit the physical downlink control channels over the frequency resources of the physical downlink control channels.

Optionally before the frequency resources of the physical downlink control channels are determined at least according to the coverage enhancement levels corresponding to the physical downlink control channels, the frequency resource determining unit is further configured: to determine the frequency resources of the physical downlink control channels with the different coverage enhancement levels respectively, and to notify a UE independently of the frequency resources of the physical downlink control channels with the different coverage enhancement levels.

Optionally if a Physical Random Access Channel (PRACH) corresponding to a coverage enhancement level has a plurality of available frequency resources in the same sub-frame, then the frequency resource determining unit is further configured to determine a frequency resource of the physical downlink control channel according to a frequency resource for transmitting the PRACH, wherein the frequency resources of the physical downlink control channel, corresponding to different PRACH frequency resources of the PRACH in the same sub-frame are configured independently.

Optionally before the frequency resources of the physical downlink control channels are determined, the frequency resource determining unit is further configured: for each coverage enhancement level, to determine frequency resources of the physical downlink control channel, corresponding to different PRACH frequency resources of a PRACH corresponding to the coverage enhancement level in the same sub-frame, and to notify the UE independently of the frequency resources of the physical downlink control channel, corresponding to the different PRACH frequency resources of the PRACH corresponding to the coverage enhancement level in the same sub-frame.

Optionally the frequency resource determining unit notifies the UE independently of the frequency resources of the physical downlink control channel via system information.

Optionally the coverage enhancement levels each are represented as a number of dBs of coverage enhancement and/or a number of repetition transmissions, wherein the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the transmitting unit transmits the physical downlink control channels as Enhanced Physical Downlink Control Channels (EPDCCHs) over the frequency resources of the physical downlink control channels.

Optionally the transmitting unit transmits the physical downlink control channels in a common search space, and scrambles the physical downlink control channels using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include: information about narrow bands in which the physical downlink control channels are transmitted, and/or information about indices of Enhanced Control Channel Elements (ECCEs) in which the physical downlink control channels are transmitted; or a common search space where the physical downlink control channels are transmitted.

An embodiment of the disclosure provides an apparatus for transmitting a random access response at the UE side, the apparatus including: a frequency resource determining unit configured to determine frequency resources of physical downlink control channels at least according to coverage enhancement levels corresponding to the physical downlink control channels, wherein the frequency resources of the physical downlink control channels with different coverage enhancement levels are configured independently; and a receiving unit configured to receive the physical downlink control channels over the frequency resources of the physical downlink control channels.

Optionally before the frequency resources of the physical downlink control channels are determined at least according to the coverage enhancement levels corresponding to the physical downlink control channels, the frequency resource determining unit is further configured: to obtain configuration information indicating the frequency resources of the physical downlink control channels with the different coverage enhancement levels independently, and to obtain the frequency resources of the physical downlink control channels with the different coverage enhancement levels according to the configuration information.

Optionally if a PRACH corresponding to the coverage enhancement level has a plurality of available frequency resources in the same sub-frame, then the frequency resource determining unit is further configured to determine a frequency resource of the physical downlink control channel according to a frequency resource for transmitting the PRACH of the UE, wherein the frequency resources of the physical downlink control channel, corresponding to different PRACH frequency resources of the PRACH corresponding to the coverage enhancement level in the same sub-frame are configured independently.

Optionally before the frequency resource of the physical downlink control channel are determined according to the frequency resource for transmitting the PRACH of the UE, the frequency resource determining unit is further configured: to obtain configuration information indicating the frequency resources of the physical downlink control channel, corresponding to the different PRACH frequency resources of the PRACH corresponding to each coverage enhancement level in the same sub-frame independently, and to obtain the frequency resources of the physical downlink control channel, corresponding to the different PRACH frequency resources of the PRACH corresponding to each coverage enhancement level in the same sub-frame according to the configuration information.

Optionally the configuration information indicating the frequency resources of the physical downlink control channel is obtained via system information.

Optionally the coverage enhancement levels each are represented as a number of dBs of coverage enhancement and/or a number of repetition transmissions, wherein the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the receiving unit receives the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include: information about narrow bands in which the physical downlink control channels are transmitted, and/or information about indices of Enhanced Control Channel Elements (ECCEs) in which the physical downlink control channels are transmitted; or a common search space where the physical downlink control channels are transmitted.

BRIEF DESCRIPTION OF THE DRAWINGS

FIG. 5 is a schematic diagram of Msg4 transmission according to a second embodiment of the disclosure;

FIG. 6 is a schematic flow chart of a method for transmitting a random access response at the network side according to an embodiment of the disclosure;

DETAILED DESCRIPTION OF THE EMBODIMENTS

Figure 1:
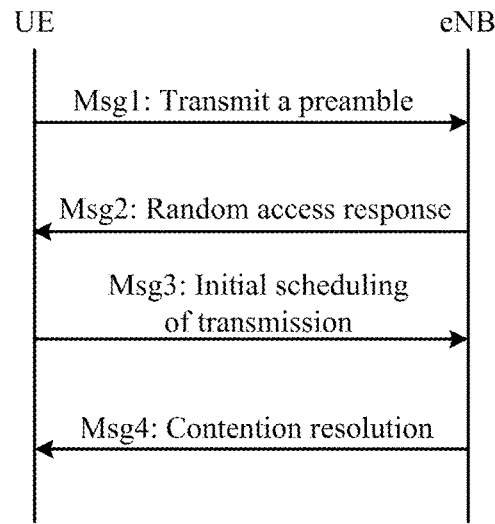
FIG. 1 is a schematic flow chart of a contention based random access in the prior art.

The embodiments of the disclosure provide a method and apparatus for transmitting a random access response so as to enable random access responses of different coverage enhancement levels to be transmitted independently, to thereby reduce the number of blind detections by a UE on physical downlink control channels, and save power consumption of the UE.

The network side (e.g., a base station) according to the embodiments of the disclosure configures normal coverage and different coverage enhancement levels, or only the different coverage enhancement levels independently with frequency resources for transmitting downlink control channels scrambled with RA-RNTIs, and notifies (e.g., via system information) a UE of the frequency resources; and the UE determines its coverage condition, that is, whether the UE is in a normal coverage mode or an enhanced coverage mode, and if the UE is in an enhanced coverage mode, then the UE may determine the particular one of the levels for the enhanced coverage mode, and thereby select corresponding one of the frequency resources to detect its downlink control channel scrambled with the RA-RNTI.

If the PRACH resource corresponding to the normal coverage, or one of the coverage enhancement levels has a plurality of available frequency resource positions in the frequency domain in the same sub-frame, then each frequency resource position may be configured independently with a frequency resource for transmitting a downlink control channel scrambled using the RA-RNTI.

The downlink control channel is transmitted as an Enhanced Physical Downlink Control Channel (EPDCCH).

The frequency resources include narrow band information and/or Enhanced Control Channel Element (ECCE) number information; or the frequency resources are a common search space (where there are more ECCEs, so a plurality of UEs in an enhanced coverage mode at the same level share the same common search space, and each UE determines a frequency resource corresponding to its RA-RNTI through blind detection in the common search space).

Where the numbers of ECCEs for transmitting the EPDCCHs scrambled with the RA-RNTIs corresponding to the UEs under different coverage conditions may or may not be the same, and the ECCEs may or may not be consecutive.

When the frequency resources are a common search space, the UE detects the downlink control channel scrambled with its corresponding RA-RNTI blindly in the common search space; and the common search space can support multiplexed transmission of downlink control channels, of a plurality of UEs under the same coverage condition and with different RA-RNTIs, scrambled using the RA-RNTIs.

When the UE is in the normal coverage mode, the downlink control channel scrambled using the RA-RNTI is transmitted in the first available downlink sub-frame starting with the sub-frame n+k, or is transmitted in a sub-frame in a random access response window with the length of N starting with the first available downlink sub-frame starting with the sub-frame n+k, where n is the last one of sub-frames for transmitting a PRACH corresponding to the RA-RNTI, N is a pre-configured length of the random access response window, and k is a delay of processing, e.g., k=3. That is, the UE detects the downlink control channel scrambled using the RA-RNTI in the first available downlink sub-frame starting with the sub-frame n+k, or detects the downlink control channel scrambled using the RA-RNTI blindly in each sub-frame in the random access response window with the length of N starting with the first available downlink sub-frame starting with the sub-frame n+k.

When the UE is in the enhanced coverage mode, a set of sub-frames for transmitting the downlink control channel scrambled using the RA-RNTI includes a set of downlink sub-frames starting with the first available downlink sub-frame starting with the sub-frame n+k, where the number of downlink sub-frames in the set of downlink sub-frames is the number of repetition transmissions corresponding to the coverage enhancement level, n is the last one of sub-frames for retransmitting a PRACH corresponding to the RA-RNTI.

Several particular embodiments will be described below.

Figure 2:
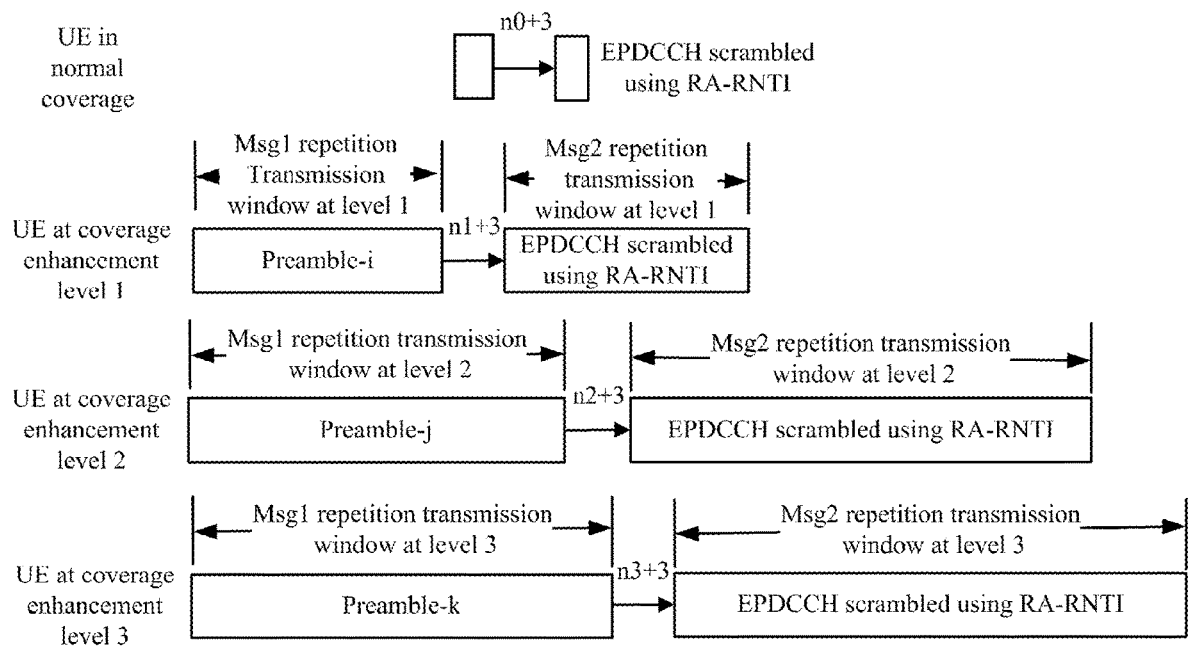
FIG. 2 is a schematic diagram of Msg2 transmission according to a first embodiment of the disclosure.

In a first embodiment, FIG. 2 illustrates msg1 and msg2 transmission of UEs in normal coverage and with different coverage enhancement levels, where at least one of preambles, temporal positions, and frequency positions for the UE in normal coverage and the UEs with the different coverage enhancement levels are different from each other. All of timing relationships between the msg1 and the msg2 of the UEs in normal coverage and with the different coverage enhancement levels are determined by their last preamble transmission sub-frames n+3.

In an instance, the following information is signaled in advance via System Information Block (SIB) information.

An EPDCCH scrambled using an RA-RNTI of the UE in normal coverage is transmitted in ECCE0 to ECCE2 in a narrow band 0.

An EPDCCH scrambled using an RA-RNTI of the UE with the coverage enhancement level 1 is transmitted in ECCE3 to ECCE5 in a narrow band 0.

An EPDCCH scrambled using an RA-RNTI of the UE with the coverage enhancement level 2 is transmitted in ECCE6 to ECCE9 in a narrow band 0.

An EPDCCH scrambled using an RA-RNTI of the UE with the coverage enhancement level 3 is transmitted in ECCE10 to ECCE15 in a narrow band 0.

All of these EPDCCHs are transmitted in their corresponding all ECCEs in each sub-frame, and the UE can receive the EPDCCH scrambled using its RA-RNTI directly according to the RA-RNTI, and over the corresponding frequency resource starting with a start sub-frame determined as per the timing of n+3 instead of detecting its EPDCCH blindly. Since the frequency resources for transmitting the EPDCCHs scrambled the RA-RNTIs of the UEs in normal coverage and with the different coverage enhancement levels are independent and do not overlap with each other, no resource collision may occur, although the different EPDCCHs are transmitted in overlapping periods of time. Where the narrow bands configured for the UEs under the different coverage conditions may or may not be the same, the positions of the narrow bands may be other narrow bands, the numbers of ECCEs, for transmitting the EPDCCHs scrambled using the RA-RNTIs, corresponding to the UEs under the different coverage conditions may or may not be the same, and the ECCEs may or may not be consecutive, and will not be limited to the exemplary numbers thereof.

In another instance, the following information is signaled in advance via SIB information.

An EPDCCH scrambled using an RA-RNTI of the UE in normal coverage is transmitted in a common search space 0 (where the common search space can be defined as six RBs in a narrow band i, or some X RBs in a system bandwidth, for example, where X is less than or equal to 6, and the same definition will apply to the following common search spaces, although a repeated description thereof will be omitted).

An EPDCCH scrambled using an RA-RNTI of the UE with the coverage enhancement level 1 is transmitted in a common search space 1.

An EPDCCH scrambled using an RA-RNTI of the UE with the coverage enhancement level 2 is transmitted in the common search space 1.

An EPDCCH scrambled using an RA-RNTI of the UE with the coverage enhancement level 3 is transmitted in a common search space 2.

Figure 3:
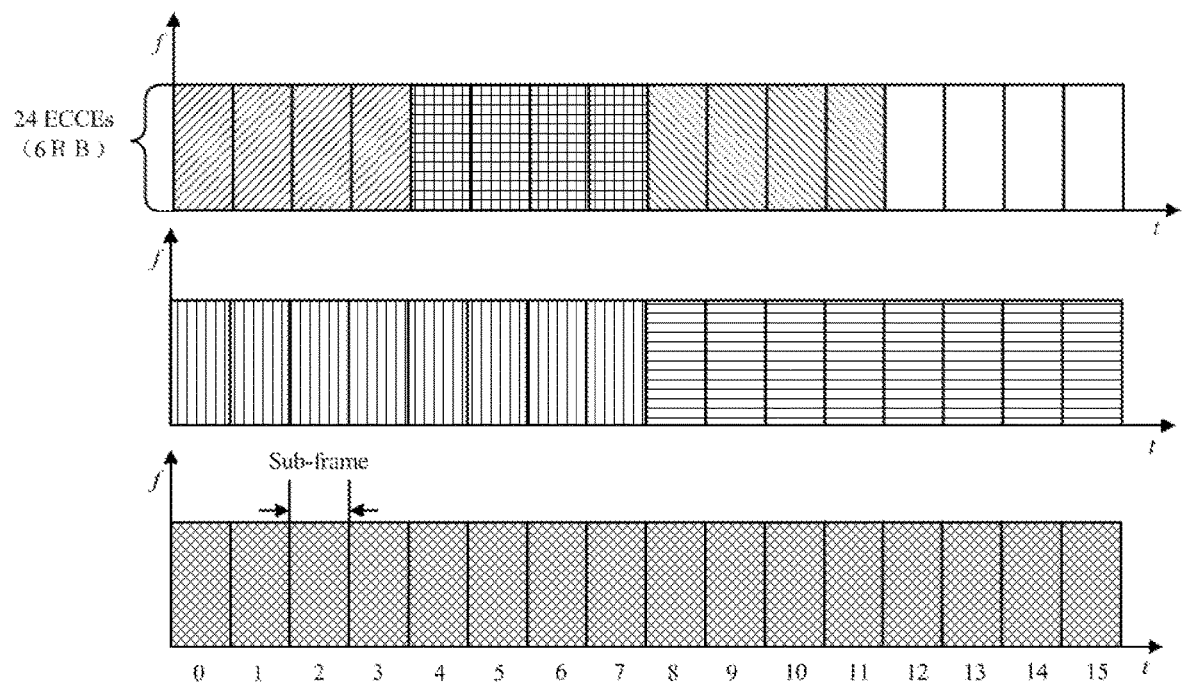
FIG. 3 is a schematic diagram of EPDCCH common search space division according to an embodiment of the disclosure.
Figure 4:
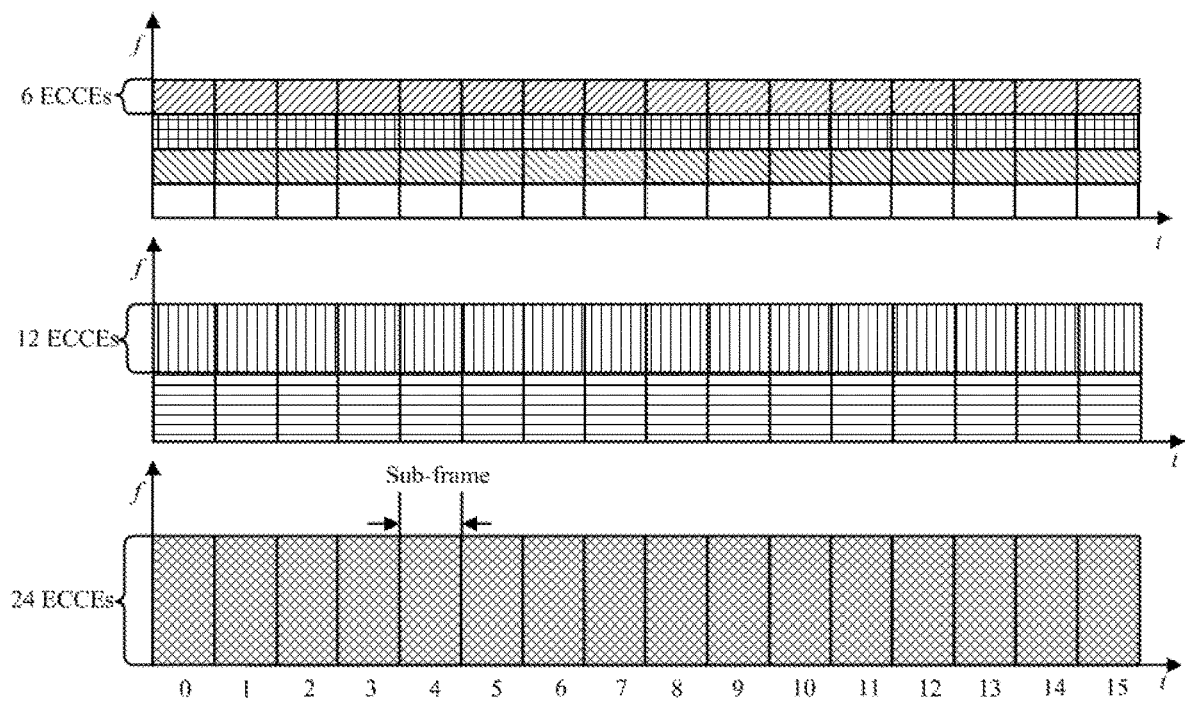
FIG. 4 is another schematic diagram of EPDCCH common search space division according to an embodiment of the disclosure.

At this time, candidate EPDCCHs in a common search space can be divided as illustrated in FIG. 3 or FIG. 4, an EPDCCH scrambled using an RA-RNTI occupies one of candidate EPDCCH transmission windows (sub-frames filled with the same filling pattern as illustrated), the EPDCCHs scrambled using the RA-RNTIs corresponding to the different coverage conditions are configured with independent ECCE aggregation levels and numbers of repetition transmission sub-frames (the number of sub-frames is 1 for normal coverage). That is, the EPDCCHs are transmitted in candidate EPDCCH areas filled with different filling patterns corresponding to the ECCE aggregation levels and the numbers of repetition transmission sub-frames, configured for the EPDCCHs, as illustrated in FIG. 3 or FIG. 4. The UEs do not know where the EPDCCHs scrambled using their RA-RNTIs are transmitted in the candidate EPDCCH areas corresponding to their ECCE aggregation levels or numbers of repetition transmission sub-frames, and need to detect their EPDCCHs blindly according to their RA-RNTIs and their aggregation levels and numbers of repetition transmission sub-frames corresponding to the EPDCCHs.

The UEs detect their EPDCCHs blindly at candidate EPDCCH positions filled with the different filling patterns corresponding to the aggregation levels and the numbers of repetition transmission sub-frames as illustrated in FIG. 3 or FIG. 4. The RA-RNTIs of the UEs transmitting in the same common search space need to be different.

For example, the UEs at the level 1 and the level 2 share the common search space 1, so there are different RA-RNTIs of the UE at the level 1 and the UE at the level 2, and the eNB may map the EPDCCHs scrambled using the RA-RNTIs of the UEs at the level 1 and the level 2 into the candidate EPDCCH areas, filled with the different filling patterns, into which the common search space 1 is divided as illustrated in FIG. 3 or FIG. 4, and transmit them. For example, in the TDM division pattern as illustrated in FIG. 3, the eNB pre-configures the UE at the level 1 with the ECCE aggregation level of 24 and the number 4 of repetition transmission sub-frames, so the EPDCCH scrambled using the RA-RNTI of the UE at the level 1 can be transmitted on one of candidate EPDCCH positions filled with different filling patterns, corresponding to the ECCE aggregation level of 24 and the number 4 of repetition transmission sub-frames in FIG. 3 (i.e., as illustrated in the uppermost segment of FIG. 3), and the eNB can select one of the candidate EPDCCH positions to transmit the EPDCCH scrambled using the RA-RNTI of the UE at the level 1.

For example, the eNB selects the second candidate EPDCCH position in the uppermost segment of FIG. 3 (i.e., in the fifth to eighth sub-frames in the uppermost segment of FIG. 3) to transmit the EPDCCH scrambled using the RA-RNTI of the UE at the level 1. The UE at the level 1 can only determine that the EPDCCH thereof may be transmitted only on one of the candidate EPDCCH positions illustrated in the uppermost segment of FIG. 3, but can not determine in which four sub-frames the EPDCCH thereof may be transmitted according to the ECCE aggregation level and the number of repetition transmission sub-frames configured for the EPDCCH thereof, so the UE at the level 1 needs to detect the EPDCCH scrambled using the RA-RNTI thereof blindly in the candidate EPDCCH areas filled with the different filling patterns as illustrated in the uppermost segment of FIG. 3. That is, the UE detects the EPDCCH scrambled using the RA-RNTI once at the ECCE aggregation level of 24 in the first to fourth sub-frames (that is, the UE receives the EPDCCH in 24 ECCEs in the first to fourth sub-frames respectively, merges received information in the sub-frames, and finally judges from a CRC check thereof, and if the check is passed, then the EPDCCH may be correct; otherwise, the EPDCCH may be incorrect. The same process will apply below, so a repeated description thereof will be omitted), and if no EPDCCH is detected, then the UE may further detect the EPDCCH scrambled using the RA-RNTI once at the ECCE aggregation level of 24 in the fifth to eighth sub-frames, and so on until the UE detects the EPDCCH thereof. The eNB pre-configures the UE at the level 2 with the ECCE aggregation level of 24 and the number 8 of repetition transmission sub-frames, so the EPDCCH scrambled using the RA-RNTI of the UE at the level 2 can be transmitted on one of candidate EPDCCH positions filled with different filling patterns, corresponding to the ECCE aggregation level of 24 and the number 8 of repetition transmission sub-frames in FIG. 3 (i.e., as illustrated in the middle segment of FIG. 3). The eNB can select one of the candidate EPDCCH positions to transmit the EPDCCH scrambled using the RA-RNTI of the UE at the level 2.

For example, the eNB selects the second candidate EPDCCH position in the middle segment of FIG. 3 (i.e., in the ninth to sixth sub-frames in the middle segment of FIG. 3) to transmit the EPDCCH scrambled using the RA-RNTI of the UE at the level 2. The UE at the level 2 can only determine that the EPDCCH thereof may be transmitted only on one of the candidate EPDCCH positions illustrated in the uppermost segment of FIG. 3, but can not determine in which eight sub-frames the EPDCCH thereof may be transmitted, according to the ECCE aggregation level and the number of repetition transmission sub-frames configured for the EPDCCH thereof, so the UE at the level 2 needs to detect the EPDCCH scrambled using the RA-RNTI thereof blindly in the candidate EPDCCH areas filled with the different filling patterns as illustrated in the middle segment of FIG. 3, that is, the UE detects the EPDCCH scrambled using the RA-RNTI once at the ECCE aggregation level of 24 in the first to eighth sub-frames (that is, the UE receives the EPDCCH in 24 ECCEs in the first to eighth sub-frames respectively, merges received information in the sub-frames, and finally judges from a CRC check thereof, and if the check is passed, then the EPDCCH may be correct; otherwise, the EPDCCH may be incorrect. The same process will apply below, so a repeated description thereof will be omitted), and if no EPDCCH is detected, then the UE may further detect the EPDCCH scrambled using the RA-RNTI once at the ECCE aggregation level of 24 in the ninth to sixth sub-frames, and so on until the UE detects the EPDCCH thereof.

In another example, in the FDM division pattern as illustrated in FIG. 4, the eNB pre-configures the UE at the level 1 with the ECCE aggregation level of 6 and the number 16 of repetition transmission sub-frames, so the EPDCCH scrambled using the RA-RNTI of the UE at the level 1 can be transmitted on one of candidate EPDCCH positions filled with different filling patterns, corresponding to the ECCE aggregation level of 6 and the number 16 of repetition transmission sub-frames in FIG. 4 (i.e., as illustrated in the uppermost segment of FIG. 4). The eNB can select one of the candidate EPDCCH positions to transmit the EPDCCH scrambled using the RA-RNTI of the UE at the level 1. For example, the eNB selects the second candidate EPDCCH position in the uppermost segment of FIG. 4 (i.e., in 16 sub-frames corresponding to the second set of six ECCE frequency resources from the top to the bottom in the uppermost segment of FIG. 4) to transmit the EPDCCH of the UE at the level 1. The UE at the level 1 can only determine that the EPDCCH thereof may be transmitted only on one of the candidate EPDCCH positions illustrated in the uppermost segment of FIG. 4, but can not determine in which six ECCEs the EPDCCH thereof may be transmitted, according to the ECCE aggregation level and the number of repetition transmission sub-frames configured for the EPDCCH thereof, so the UE at the level 1 needs to detect the EPDCCH scrambled using the RA-RNTI thereof blindly in the candidate EPDCCH areas filled with the different filling patterns as illustrated in the uppermost segment of FIG. 4, that is, the UE detects the EPDCCH scrambled using the RA-RNTI once in 16 sub-frames in the first set of six ECCEs from the top to the bottom (or from the bottom to the top) (that is, the UE receives the EPDCCH in the first set of six ECCEs in the 16 sub-frames respectively, merges received information in the sub-frames, and finally judges from a CRC check thereof, and if the check is passed, then the EPDCCH may be correct; otherwise, the EPDCCH may be incorrect. The same process will apply below, so a repeated description thereof will be omitted), and if no EPDCCH is detected, then the UE may further detect the EPDCCH scrambled using the RA-RNTI once in 16 sub-frames in the second set of six ECCEs, and so on until the UE detects the EPDCCH thereof. The eNB pre-configures the UE at the level 2 with the ECCE aggregation level of 12 and the number 16 of repetition transmission sub-frames, so the EPDCCH scrambled using the RA-RNTI of the UE at the level 2 can be transmitted on one of candidate EPDCCH positions filled with different filling patterns, corresponding to the ECCE aggregation level of 12 and the number 16 of repetition transmission sub-frames in FIG. 4 (i.e., as illustrated in the middle segment of FIG. 4). The eNB can select one of the candidate EPDCCH positions to transmit the EPDCCH scrambled using the RA-RNTI of the UE at the level 2.

For example, the eNB selects the second candidate EPDCCH position in the middle segment of FIG. 4 (i.e., in 16 sub-frames corresponding to the second set of twelve ECCE frequency resources from the top to the bottom in the middle segment of FIG. 4) to transmit the EPDCCH of the UE at the level 2. The UE at the level 2 can only determine that the EPDCCH thereof may be transmitted only on one of the candidate EPDCCH positions illustrated in the middle segment of FIG. 4, but cannot determine in which twelve ECCEs the EPDCCH thereof may be transmitted, according to the ECCE aggregation level and the number of repetition transmission sub-frames configured for the EPDCCH thereof, so the UE at the level 2 needs to detect the EPDCCH scrambled using the RA-RNTI thereof blindly in the candidate EPDCCH areas filled with the different filling patterns as illustrated in the middle segment of FIG. 4. That is, the UE detects the EPDCCH scrambled using the RA-RNTI once in 16 sub-frames in the first set of twelve ECCEs from the top to the bottom (or from the bottom to the top) (that is, the UE receives the EPDCCH in the first set of twelve ECCEs in the 16 sub-frames respectively, merges received information in the sub-frames, and finally judges from a CRC check thereof, and if the check is passed, then the EPDCCH may be correct; otherwise, the EPDCCH may be incorrect. The same process will apply below, so a repeated description thereof will be omitted), and if no EPDCCH is detected, then the UE may further detect the EPDCCH scrambled using the RA-RNTI once in 16 sub-frames in the second set of twelve ECCEs, and so on until the UE detects the EPDCCH thereof. If the same coverage condition, i.e., the coverage level 3 is configured with a plurality of PRACH frequency resources in the same sub-frame, then there may be different RA-RNTIs corresponding to different UEs at the level 3 transmitting over the different PRACH frequency resources in the same sub-frame, and EPDCCHs scrambled using their RA-RNTIs may be transmitted in a multiplexed mode in the common search space 2 in the same way as in the common search space 1 at the level 1 and level 2.

Since the frequency resources for transmitting the EPDCCHs scrambled using the RA-RNTIs of the UEs in normal coverage and enhanced coverage are independent, and do not overlap with each other, no resource collision may occur, although the EPDCCHs scrambled using the RA-RNTIs of the UEs in normal coverage and enhanced coverage are transmitted in overlapping periods of time. The same common search space is shared for the coverage enhancement levels 1 and 2, and the EPDCCHs scrambled using the RA-RNTIs of the UE at the level 1 and the UE at the level 2 are transmitted in the different candidate EPDCCH areas according to their differently configured ECCE aggregation levels and numbers of repetition transmission sub-frames, so no collision may occur. The configuration of the common search spaces under the different coverage conditions will not be limited to the examples given above, but the positions of the common search spaces can be changed, or the same common search space can be shared for the different coverage conditions, or separate common search spaces can be configured for the different coverage conditions, without departing from the scope of the disclosure.

Where FIG. 3 only illustrates the spaces divided with 4, 8, and 16 sub-frames for repetition transmission by way of an example, but the spaces can be divided with other numbers of repetition transmission sub-frames, and more candidates in the time domain. FIG. 4 only illustrates the spaces divided with the ECCE aggregation levels of 6, 12, and 24 by way of an example, but the spaces can be divided with other aggregation levels, and more or less than 16 sub-frames in the time domain, without departing from the scope of the disclosure.

In a second embodiment, FIG. 5 illustrates msg3 and msg4 transmission of UEs in normal coverage and with different coverage enhancement levels. All of timing relationships between the msg3 and the msg4 of the UEs in normal coverage and with the different coverage enhancement levels are determined by their last msg3 transmission sub-frames n+3.

The following information is signaled in advance via SIB information.

An EPDCCH scrambled using a TC-RNTI of the UE in normal coverage is transmitted in a common search space 0.

An EPDCCH scrambled using a TC-RNTI of the UE with the coverage enhancement level 1 is transmitted in a common search space 1.

An EPDCCH scrambled using a TC-RNTI of the UE with the coverage enhancement level 2 is transmitted in the common search space 2.

An EPDCCH scrambled using a TC-RNTI of the UE with the coverage enhancement level 3 is transmitted in a common search space 3.

Candidate EPDCCHs in a common search space can also be divided as illustrated in FIG. 3 or FIG. 4, an EPDCCH scrambled using a TC-RNTI occupies one of candidate EPDCCH transmission windows (sub-frames filled with the same filling pattern as illustrated). Different UEs under the same coverage condition correspond to different TC-RNTIs and can be configured with the same ECCE aggregation level and number of repetition transmission sub-frames, and transmit over an EPDCCH candidate corresponding to the ECCE aggregation level and the number of repetition transmission sub-frames (i.e., one of areas filled with different filling patterns corresponding to the ECCE aggregation level and the number of repetition transmission sub-frames in FIG. 3 or FIG. 4), so that Msg4 scheduling signaling of the different UEs with the same coverage enhancement level is transmitted in a multiplexed mode. The UEs do not know where the EPDCCHs scrambled using their TC-RNTIs are transmitted in the candidate EPDCCH areas corresponding to their ECCE aggregation levels or numbers of repetition transmission sub-frames, and need to detect their EPDCCHs blindly at the candidate EPDCH positions filled with the different filling patterns corresponding to the ECCE aggregation levels and the numbers of repetition transmission sub-frames of the UEs, as illustrated in FIG. 3 or FIG. 4, according to their TC-RNTIs, and their aggregation levels and numbers of repetition transmission sub-frames corresponding to the EPDCCHs. For example, for the coverage enhancement level 1, a UE 1 corresponding to a TC-RNTI-1, a UE 2 corresponding to a TC-RNTI-2, and a UE 3 corresponding to a TC-RNTI-3 share the common search space 1, so in the TDM multiplexing mode illustrated in FIG. 3, all of the UE1, the UE2, and the UE3 are configured with the number 4 of repetition transmission sub-frames and the ECCE aggregation level of 24 for their EPDCCHs, so that the eNB can map the EPDCCHs scrambled using the TC-RNTIs of the UEs 1, 2, and 3 respectively into any three ones of the areas filled with the four different filling patterns (i.e., the four different filled areas in the uppermost segment of FIG. 3) corresponding to the ECCE aggregation level of 24 and the number 4 of repetition transmission sub-frames in FIG. 3 in the common search space 1, but the UEs do not know the specific positions of their EPDCCHs, and need to detect their corresponding EPDCCHs blindly using their TC-RNTIs in the areas filled with the four different filling patterns corresponding to the ECCE aggregation level of 24 and the number 4 of repetition transmission sub-frames in FIG. 3. Or in the FDM multiplexing mode illustrated in FIG. 4, all of the UE1, the UE2, and the UE3 are configured with the number 16 of repetition transmission sub-frames and the ECCE aggregation level of 6 for their EPDCCHs, so that the eNB can map the EPDCCHs scrambled using the TC-RNTIs of the UEs 1, 2, and 3 respectively into any three ones of the areas filled with the four different colors (i.e., the four different filled area in the uppermost segment of FIG. 4) corresponding to the ECCE aggregation level of 6 and the number 16 of repetition transmission sub-frames in FIG. 4 in the common search space 1, but the UEs do not know the specific positions of their EPDCCHs, and need to detect their corresponding EPDCCHs blindly using their TC-RNTIs in the areas filled with the four different filling patterns corresponding to the ECCE aggregation level of 6 and the number 16 of repetition transmission sub-frames in FIG. 4. Since the frequency resources for transmitting the EPDCCHs scrambled using the TC-RNTIs of the UEs in normal coverage and the different coverage enhancement levels with coverage enhancement of more than 0 dB are independent and do not overlap with each other, no resource collision may occur, although the EPDCCHs scrambled using the TC-RNTIs of the UEs in normal coverage and the different coverage enhancement levels with coverage enhancement of more than 0 dB are transmitted in overlapping periods of time. The configuration of the common search spaces under the different coverage conditions will not be limited to the examples given above, but the positions of the common search spaces can be changed, or the same common search space can be shared for the different coverage conditions, or separate common search spaces can be configured for the different coverage conditions, without departing from the scope of the disclosure.

Apparently, an embodiment of the disclosure provides a method for transmitting a random access response at the network side as illustrated in FIG. 6, where the method includes the following steps.

S101: The network side determines frequency resources of physical downlink control channels at least according to coverage enhancement levels corresponding to the physical downlink control channels, where the frequency resources of the physical downlink control channels with the different coverage enhancement levels are configured independently.

S102: The network side transmits the physical downlink control channels over the frequency resources of the physical downlink control channels.

Optionally before the network side determines the frequency resources of the physical downlink control channels at least according to the coverage enhancement levels corresponding to the physical downlink control channels, the method further includes the following steps.

The network side determines the frequency resources of the physical downlink control channels with the different coverage enhancement levels respectively, and notifies a UE independently of the frequency resources of the physical downlink control channels with the different coverage enhancement levels.

Optionally if a Physical Random Access Channel (PRACH) corresponding to a coverage enhancement level has a plurality of available frequency resources in the same sub-frame, then the network side may further determine a frequency resource of the physical downlink control channel according to a frequency resource for transmitting the PRACH, where the frequency resources of the physical downlink control channel, corresponding to the different PRACH frequency resources of the PRACH in the same sub-frame are configured independently. For example, for the same coverage enhancement level, a PRACH is configured with two or more than two PRACH frequency resources in the same sub-frame, and a UE can select one of them randomly to transmit the PRACH, so different UEs at the coverage enhancement level can select the different PRACH frequency resources in the same sub-frame, and transmit their PRACHs concurrently, where there is the same repetition transmission transmission sub-frame of the PRACHs for these UEs. The Msg2 of these UEs are also transmitted concurrently according to the same timing relationship between the msg1 and the msg2, and their msg4 are also transmitted concurrently. If these UEs share their Msg2/

Msg4 resources, then resource collision may occur, so that some UE has no resource to transmit the Msg2/Msg4. In view of this, the frequency resources of the PRACH in the same sub-frame are also configured respectively with a plurality of different frequency resources of the physical downlink control channel, so that when the UE1 selects a PRACH frequency resource 1 to transmit the PRACH, its physical downlink control channel scheduling an RAR and/or physical downlink control channel scheduling the Msg4 is transmitted over a physical downlink control channel frequency resource 1 corresponding to the PRACH frequency resource 1; when the UE2 selects a PRACH frequency resource 2 to transmit the PRACH, its physical downlink control channel scheduling an RAR and/or physical downlink control channel scheduling the Msg4 is transmitted over a physical downlink control channel frequency resource 2 corresponding to the PRACH frequency resource 2; and so on, so that the physical downlink control channels of the different UEs transmitting in the same sub-frame can be transmitted over the different frequency resources to thereby avoid collision.

Stated otherwise, the downlink control channel and the PRACH correspond to the same UE, and correspond to the same coverage enhancement level. For example, the PRACH relates to the Msg1 procedure of the UE, i.e., a procedure for transmitting the preamble sequence, and the physical downlink control channel can be a physical downlink control channel scheduling the Msg2 in the Msg2 procedure of the UE (i.e., RAR message transmission), or a physical downlink control channel scheduling Msg2 in the Msg4 procedure of the UE (i.e., contention resolution message transmission), but the number of repetition transmissions of the physical downlink control channel may not necessarily be the same as that of the PRACH, and their numbers of repetition transmissions are determined independently, although both of them are dependent upon the coverage enhancement level.

Optionally before the network side determines the frequency resources of the physical downlink control channels, the method further includes the following steps.

For each coverage enhancement level, the network side determines frequency resources of the physical downlink control channel, corresponding to different PRACH frequency resources of a PRACH corresponding to the coverage enhancement level in the same sub-frame, and notifies the UE independently of the frequency resources of the physical downlink control channel, corresponding to the different PRACH frequency resources of the PRACH corresponding to the coverage enhancement level in the same sub-frame.

Optionally the network side notifies the UE independently of the frequency resources of the physical downlink control channel via system information.

For example, in a first instance, when the network side determines frequency resources of the physical downlink control channels with the different coverage enhancement levels respectively, and notifies the UE independently of the frequency resources of the physical downlink control channels with the different coverage enhancement levels, the network side notifies the UE of a correspondence relationship between the physical downlink control channels with the different coverage enhancement levels and their corresponding frequency resources, e.g., in a table; or notifies the UE of corresponding frequency resources using N bits of information respectively, for each coverage enhancement level corresponding to the physical downlink control channel.

In a second instance, when the network side determines for each coverage enhancement level, frequency resources of a physical downlink control channel, corresponding to different PRACH frequency resources of a PRACH corresponding to the coverage enhancement level in the same sub-frame, and notifies the UE independently of the frequency resources of the physical downlink control channel, corresponding to the different PRACH frequency resources of the PRACH corresponding to the coverage enhancement level in the same sub-frame, the network side notifies the UE of a correspondence relationship between a plurality of frequency resources of the PRACH and the frequency resources of the physical downlink control channel, at each coverage enhancement level, e.g., in a table; or notifies for each coverage enhancement level the UE of the frequency resource of the physical downlink control channel, corresponding to each frequency resource of the PRACH at the coverage enhancement level using N bits of information respectively.

In a combination of the first instance and the second instance above, both each different coverage enhancement level, and each different PRACH frequency resource at each level correspond independently to a frequency resource of a physical downlink control channel.

Optionally the coverage enhancement levels each are represented as a number of decibels (dBs) of coverage enhancement and/or a number of repetition transmissions, where the coverage enhancement levels include normal coverage with 0 dB of coverage enhancement and/or without any repetition transmission, and a plurality of different coverage enhancement levels with more than 0 dB of coverage enhancement and/or more than one repetition transmission. Or the coverage enhancement levels only include a plurality of different coverage enhancement levels with more than 0 dB of coverage enhancement and/or more than one repetition transmission.

Optionally the network side transmits the physical downlink control channels over the frequency resources of the physical downlink control channels particularly as follows.

The network side transmits the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Stated otherwise, RA-RNTI scrambling corresponds to transmission of an Msg2 RAR message in a random access procedure to carry scheduling information of the RAR message; and TC-RNTI or C-RNTI scrambling corresponds to transmission of an Msg4 contention resolution message in a random access procedure to carry scheduling information of the contention resolution message.

Optionally the frequency resources of the physical downlink control channels include the following information.

Information about narrow bands in which the physical downlink control channels are transmitted, and/or information about indices of Enhanced Control Channel Elements (ECCEs) in which the physical downlink control channels are transmitted. Or a common search space where the physical downlink control channels are transmitted. In an implementation, the physical downlink control channels scrambled using RA-RNTIs are configured with information about narrow bands and/or indices of ECCEs, and the physical downlink control channels scrambled using TC-RNTIs or C-RNTIs are configured with a common search space.

Figure 7:
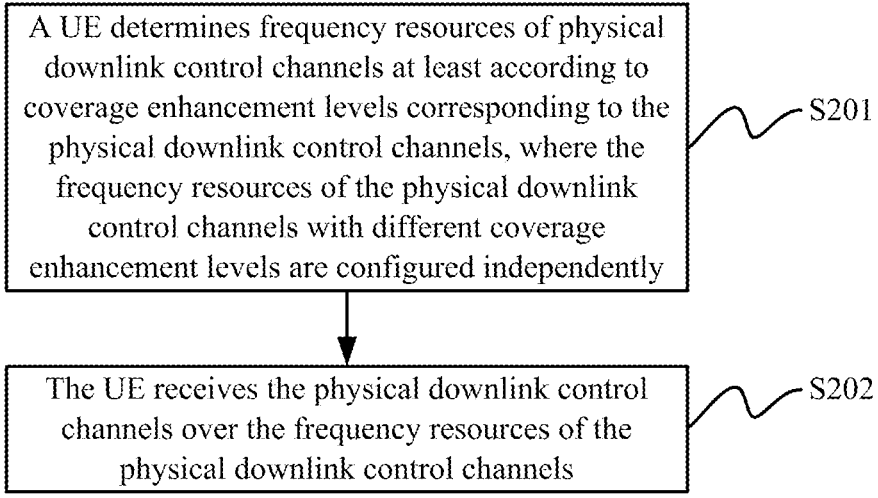
FIG. 7 is a schematic flow chart of a method for transmitting a random access response at the UE side according to an embodiment of the disclosure.

Correspondingly an embodiment of the disclosure provides a method for transmitting a random access response at the UE side as illustrated in FIG. 7, where the method includes the following steps.

S201: A UE determines frequency resources of physical downlink control channels at least according to coverage enhancement levels corresponding to the physical downlink control channels, where the frequency resources of the physical downlink control channels with the different coverage enhancement levels are configured independently.

S202: The UE receives the physical downlink control channels over the frequency resources of the physical downlink control channels.

Optionally before the UE determines the frequency resources of the physical downlink control channels at least according to the coverage enhancement levels corresponding to the physical downlink control channels, the method further includes the following steps.

The UE obtains configuration information indicating the frequency resources of the physical downlink control channels with the different coverage enhancement levels independently, and obtains the frequency resources of the physical downlink control channels with the different coverage enhancement levels according to the configuration information.

Optionally if a PRACH corresponding to the coverage enhancement level has a plurality of available frequency resources in the same sub-frame, then the UE may further determine a frequency resource of the physical downlink control channel according to a frequency resource for transmitting the PRACH of the UE, where the frequency resources of the physical downlink control channel, corresponding to the different PRACH frequency resources of the PRACH corresponding to the coverage enhancement level in the same sub-frame are configured independently.

Optionally before the UE determines the frequency resource of the physical downlink control channel according to the frequency resource for transmitting the PRACH of the UE, the method further includes the following steps.

The UE obtains configuration information indicating the frequency resources of the physical downlink control channel, corresponding to the different PRACH frequency resources of the PRACH corresponding to each coverage enhancement level in the same sub-frame independently, and obtains the frequency resources of the physical downlink control channel, corresponding to the different PRACH frequency resources of the PRACH corresponding to each coverage enhancement level in the same sub-frame according to the configuration information.

Optionally the UE obtains the configuration information indicating the frequency resources of the physical downlink control channel via system information.

Optionally the coverage enhancement levels each are represented as a number of dBs of coverage enhancement and/or a number of repetition transmissions, where the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the UE receives the physical downlink control channels over the frequency resources of the physical downlink control channels particularly as follows.

The UE receives the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include the following information.

Information about narrow bands in which the physical downlink control channels are transmitted, and/or information about indices of Enhanced Control Channel Elements (ECCEs) in which the physical downlink control channels are transmitted.

Or a common search space where the physical downlink control channels are transmitted.

Figure 8:
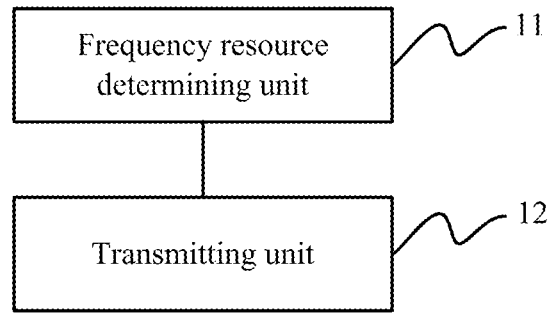
FIG. 8 is a schematic structural diagram of an apparatus for transmitting a random access response at the network side according to an embodiment of the disclosure.

In correspondence to the method above at the network side, an embodiment of the disclosure provides an apparatus for transmitting a random access response at the network side as illustrated in FIG. 8, where the apparatus includes the following components.

A frequency resource determining unit 11 is configured to determine frequency resources of physical downlink control channels at least according to coverage enhancement levels corresponding to the physical downlink control channels, where the frequency resources of the physical downlink control channels with the different coverage enhancement levels are configured independently.

A transmitting unit 12 is configured to transmit the physical downlink control channels over the frequency resources of the physical downlink control channels.

Optionally before the frequency resources of the physical downlink control channels are determined at least according to the coverage enhancement levels corresponding to the physical downlink control channels, the frequency resource determining unit is further configured: to determine the frequency resources of the physical downlink control channels with the different coverage enhancement levels respectively, and to notify a UE independently of the frequency resources of the physical downlink control channels with the different coverage enhancement levels.

Optionally if a Physical Random Access Channel (PRACH) corresponding to a coverage enhancement level has a plurality of available frequency resources in the same sub-frame, then the frequency resource determining unit is further configured to determine a frequency resource of the physical downlink control channel according to a frequency resource for transmitting the PRACH, where the frequency resources of the physical downlink control channel, corresponding to the different PRACH frequency resources of the PRACH in the same sub-frame are configured independently.

Optionally before the frequency resources of the physical downlink control channels are determined, the frequency resource determining unit is further configured: for each coverage enhancement level, to determine frequency resources of the physical downlink control channel, corresponding to different PRACH frequency resources of a PRACH corresponding to the coverage enhancement level in the same sub-frame, and to notify the UE independently of the frequency resources of the physical downlink control channel, corresponding to the different PRACH frequency resources of the PRACH corresponding to the coverage enhancement level in the same sub-frame.

Optionally the frequency resource determining unit notifies the UE independently of the frequency resources of the physical downlink control channel via system information.

Optionally the coverage enhancement levels each are represented as a number of dBs of coverage enhancement and/or a number of repetition transmissions, where the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the transmitting unit transmits the physical downlink control channels as Enhanced Physical Downlink Control Channels (EPDCCHs) over the frequency resources of the physical downlink control channels.

Optionally the transmitting unit transmits the physical downlink control channels in a common search space, and scrambles the physical downlink control channels using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include the following information.

Information about narrow bands in which the physical downlink control channels are transmitted, and/or information about indices of Enhanced Control Channel Elements (ECCEs) in which the physical downlink control channels are transmitted.

Or a common search space where the physical downlink control channels are transmitted.

Figure 9:
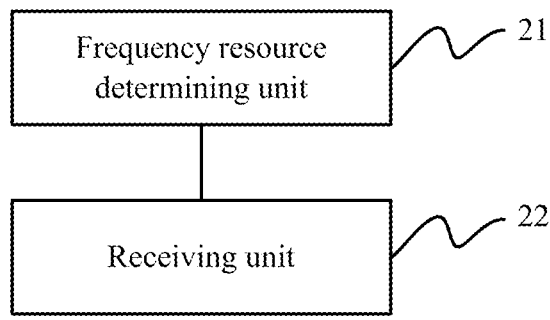
FIG. 9 is a schematic structural diagram of an apparatus for transmitting a random access response at the UE side according to an embodiment of the disclosure.

In correspondence to the method above at the UE side, an embodiment of the disclosure provides an apparatus for transmitting a random access response at the UE side as illustrated in FIG. 9, where the apparatus includes the following components.

A frequency resource determining unit 21 is configured to determine frequency resources of physical downlink control channels at least according to coverage enhancement levels corresponding to the physical downlink control channels, where the frequency resources of the physical downlink control channels with the different coverage enhancement levels are configured independently.

A receiving unit 22 is configured to receive the physical downlink control channels over the frequency resources of the physical downlink control channels.

Optionally before the frequency resources of the physical downlink control channels are determined at least according to the coverage enhancement levels corresponding to the physical downlink control channels, the frequency resource determining unit is further configured: to obtain configuration information indicating the frequency resources of the physical downlink control channels with the different coverage enhancement levels independently, and to obtain the frequency resources of the physical downlink control channel with the different coverage enhancement levels according to the configuration information.

Optionally if a PRACH corresponding to the coverage enhancement level has a plurality of available frequency resources in the same sub-frame, then the frequency resource determining unit is further configured to determine a frequency resource of the physical downlink control channel according to a frequency resource for transmitting the PRACH of the UE, where the frequency resources of the physical downlink control channel, corresponding to the different PRACH frequency resources of the PRACH corresponding to the coverage enhancement level in the same sub-frame are configured independently.

Optionally before the frequency resource of the physical downlink control channel are determined according to the frequency resource for transmitting the PRACH of the UE, the frequency resource determining unit is further configured: to obtain configuration information indicating the frequency resources of the physical downlink control channel, corresponding to the different PRACH frequency resources of the PRACH corresponding to each coverage enhancement level in the same sub-frame independently, and to obtain the frequency resources of the physical downlink control channel, corresponding to the different PRACH frequency resources of the PRACH corresponding to each coverage enhancement level in the same sub-frame according to the configuration information.

Optionally the configuration information indicating the frequency resources of the physical downlink control channel is obtained via system information.

Optionally the coverage enhancement levels each are represented as a number of dBs of coverage enhancement and/or a number of repetition transmissions, where the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the receiving unit receives the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include the following information.

Information about narrow bands in which the physical downlink control channels are transmitted, and/or information about indices of Enhanced Control Channel Elements (ECCEs) in which the physical downlink control channels are transmitted.

Or a common search space where the physical downlink control channels are transmitted.

Figure 10:
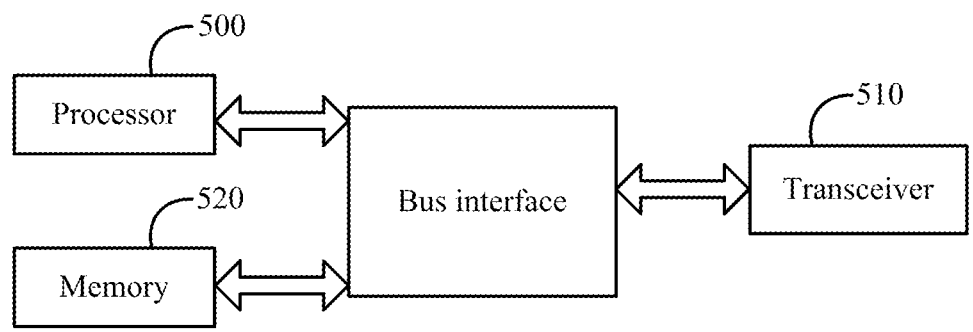
FIG. 10 is a schematic structural diagram of another apparatus for transmitting a random access response at the network side according to an embodiment of the disclosure.

An embodiment of the disclosure provides another apparatus for transmitting a random access response at the network side, which can be a network device such as a base station, as illustrated in FIG. 10, where the apparatus includes the following components.

A processor 500 is configured to read and execute program in a memory 520, to determine frequency resources of physical downlink control channels at least according to coverage enhancement levels corresponding to the physical downlink control channels, where the frequency resources of the physical downlink control channels with the different coverage enhancement levels are configured independently; and to transmit the physical downlink control channels over the frequency resources of the physical downlink control channels through a transceiver 510.

Optionally before the frequency resources of the physical downlink control channels are determined at least according to the coverage enhancement levels corresponding to the physical downlink control channels, the processor 500 is further configured: to determine the frequency resources of the physical downlink control channels with the different coverage enhancement levels respectively, and to notify a UE independently of the frequency resources of the physical downlink control channels with the different coverage enhancement levels through the transceiver 510.

Optionally if a Physical Random Access Channel (PRACH) corresponding to a coverage enhancement level has a plurality of available frequency resources in the same sub-frame, then the processor 500 is further configured to determine a frequency resource of the physical downlink control channel according to a frequency resource for transmitting the PRACH, where the frequency resources of the physical downlink control channel, corresponding to the different PRACH frequency resources of the PRACH in the same sub-frame are configured independently.

Optionally before the frequency resources of the physical downlink control channels are determined, the processor 500 is further configured: for each coverage enhancement level, to determine frequency resources of the physical downlink control channel, corresponding to different PRACH frequency resources of a PRACH corresponding to the coverage enhancement level in the same sub-frame, and to notify the UE independently of the frequency resources of the physical downlink control channel, corresponding to the different PRACH frequency resources of the PRACH corresponding to the coverage enhancement level in the same sub-frame through the transceiver 510.

Optionally the processor 500 controls the transceiver 510 to notify the UE independently of the frequency resources of the physical downlink control channel via system information.

Optionally the coverage enhancement levels each are represented as a number of dBs of coverage enhancement and/or a number of repetition transmissions, where the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the processor 500 controls the transceiver 510 to transmit the physical downlink control channels as Enhanced Physical Downlink Control Channels (EPDCCHs) over the frequency resources of the physical downlink control channels.

Optionally the processor 500 controls the transceiver 510 to transmit the physical downlink control channels in a common search space, and scrambles the physical downlink control channels using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include the following information.

Information about narrow bands in which the physical downlink control channels are transmitted, and/or information about indices of Enhanced Control Channel Elements (ECCEs) in which the physical downlink control channels are transmitted.

Or a common search space where the physical downlink control channels are transmitted.

The transceiver 510 is configured to be controlled by the processor 500 to receive and transmit data.

Here in FIG. 10, the bus architecture can include any number of interconnecting buses and bridges to particularly link together various circuits including one or more processors represented by the processor 500, and one or more memories represented by the memory 520. The bus architecture can further link together various other circuits, e.g., prophetical devices, manostats, power management circuits, etc., all of which are well known in the art, so a further description thereof will be omitted in this context. The bus interface serves as an interface. The transceiver 510 can be a number of elements including a transmitters and a receiver, which provide units for communication with various other devices over a transmission medium. The processor 500 is responsible for managing the bus architecture and performing normal processes, and the memory 520 can store data for use by the processor 500 in performing the operations.

Figure 11:
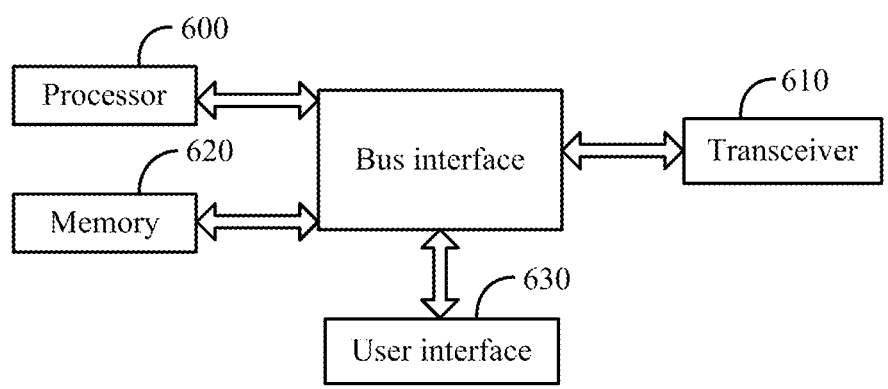
FIG. 11 is a schematic structural diagram of another apparatus for transmitting a random access response at the UE side according to an embodiment of the disclosure.

An embodiment of the disclosure provides another apparatus for transmitting a random access response at the UE side as illustrated in FIG. 11, where the apparatus includes the following components.

A processor 600 is configured to read and execute program in the memory 620, to determine frequency resources of physical downlink control channels at least according to coverage enhancement levels corresponding to the physical downlink control channels, where the frequency resources of the physical downlink control channels with the different coverage enhancement levels are configured independently; and to receive the physical downlink control channels over the frequency resources of the physical downlink control channels through a transceiver 610.

Optionally before the frequency resources of the physical downlink control channels are determined at least according to the coverage enhancement levels corresponding to the physical downlink control channels, the processor 600 is further configured: to obtain configuration information indicating the frequency resources of the physical downlink control channels with the different coverage enhancement levels independently, and to obtain the frequency resources of the physical downlink control channels with the different coverage enhancement levels according to the configuration information.

Optionally if a PRACH corresponding to the coverage enhancement level has a plurality of available frequency resources in the same sub-frame, then the processor 600 is further configured to determine a frequency resource of the physical downlink control channel according to a frequency resource for transmitting the PRACH of the UE, where the frequency resources of the physical downlink control channel, corresponding to the different PRACH frequency resources of the PRACH corresponding to the coverage enhancement level in the same sub-frame are configured independently.

Optionally before the frequency resource of the physical downlink control channel are determined according to the frequency resource for transmitting the PRACH of the UE, the processor 600 is further configured: to obtain configuration information indicating the frequency resources of the physical downlink control channel, corresponding to the different PRACH frequency resources of the PRACH corresponding to each coverage enhancement level in the same sub-frame independently, and to obtain the frequency resources of the physical downlink control channel, corresponding to the different PRACH frequency resources of the PRACH corresponding to each coverage enhancement level in the same sub-frame according to the configuration information.

Optionally the processor 600 controls the transceiver 610 to obtain the configuration information indicating the frequency resources of the physical downlink control channel via system information.

Optionally the coverage enhancement levels each are represented as a number of dBs of coverage enhancement and/or a number of repetition transmissions, where the coverage enhancement levels include normal coverage with 0 dB of coverage enhancement and/or without any repetition transmission, and a plurality of different coverage enhancement levels with more than 0 dB of coverage enhancement and/or more than one repetition transmission; or the coverage enhancement levels only include a plurality of different coverage enhancement levels with more than 0 dB of coverage enhancement and/or more than one repetition transmission.

Optionally the processor 600 controls the transceiver 610 to receive the physical downlink control channels as Enhanced Physical Downlink Control Channels (EPDCCHs) over the frequency resources of the physical downlink control channels.

Optionally the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs).

Optionally the frequency resources of the physical downlink control channels include the following information.

Information about narrow bands in which the physical downlink control channels are transmitted, and/or information about indices of Enhanced Control Channel Elements (ECCEs) in which the physical downlink control channels are transmitted.

Or a common search space where the physical downlink control channels are transmitted.

The transceiver 610 is configured to be controlled by the processor 600 to receive and transmit data.

Here in FIG. 11, the bus architecture can include any number of interconnecting buses and bridges to particularly link together various circuits including one or more processors represented by the processor 600, and one or more memories represented by the memory 620. The bus architecture can further link together various other circuits, e.g., prophetical devices, manostats, power management circuits, etc., all of which are well known in the art, so a further description thereof will be omitted in this context. The bus interface serves as an interface. The transceiver 610 can be a number of elements including a transmitter and a receiver, which are units for communication with various other devices over a transmission medium. For different user equipments, a user interface 630 can also be an interface via which desirable devices can be connected internally or externally, and the connected devices can include but will not be limited to a keypad, a display, a speaker, a microphone, a joystick, etc.

The processor 600 is responsible for managing the bus architecture and performing normal processes, and the memory 620 can store data for use by the processor 600 in performing the operations.

In summary, the embodiments of the disclosure provide a method and apparatus for transmitting a random access response, where the downlink control channels, scrambled using the RA-RNTIs, to schedule the random access responses in normal coverage and at the different coverage enchantment levels, or at the different coverage enchantment levels are transmitted in the FDM mode to thereby avoid resource collision between normal coverage and the different coverage enchantment levels, or resource collision between the different coverage enchantment levels so as to enable the random access responses at the different coverage enchantment levels to be transmitted independently, to reduce the number of blind detections on the downlink control channels, and to improve the utilization ratio of power.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for transmitting a random access response, the method comprising:
   determining, by the network side, frequency resources of physical downlink control channels at least according to coverage enhancement levels corresponding to the physical downlink control channels, wherein the frequency resources of the physical downlink control channels with different coverage enhancement levels are configured independently, wherein the physical downlink control channel is used for scheduling a physical downlink shared channel carrying the random access response; and
   transmitting, by the network side, the physical downlink control channels over the frequency resources of the physical downlink control channels.

2. The method according to claim 1, wherein before the network side determines the frequency resources of the physical downlink control channels at least according to the coverage enhancement levels corresponding to the physical downlink control channels, the method further comprises:
   determining, by the network side, the frequency resources of the physical downlink control channels with the different coverage enhancement levels respectively, and notifying a UE independently of the frequency resources of the physical downlink control channels with the different coverage enhancement levels.

3. The method according to claim 1, wherein if a Physical Random Access Channel (PRACH) corresponding to the coverage enhancement level has a plurality of available frequency resources in the same sub-frame, then the network side further determines a frequency resource of the physical downlink control channel according to a frequency resource for transmitting the PRACH, wherein the frequency resources of the physical downlink control channel, corresponding to the different PRACH frequency resources of the PRACH in the same sub-frame are configured independently.

4. The method according to claim 3, wherein before the network side determines the frequency resources of the physical downlink control channels, the method further comprises:

for each coverage enhancement level, determining, by the network side, frequency resources of the physical downlink control channel, corresponding to different PRACH frequency resources of a PRACH corresponding to the coverage enhancement level in the same sub-frame, and notifying the UE independently of the frequency resources of the physical downlink control channel, corresponding to the different PRACH frequency resources of the PRACH corresponding to the coverage enhancement level in the same sub-frame.

5. The method according to claim 1, wherein the UE is notified independently of the frequency resources of the physical downlink control channel via system information.

6. The method according to claim 1, wherein the coverage enhancement levels each are represented as a number of dBs of coverage enhancement and/or a number of repetition transmissions, wherein the coverage enhancement levels comprise normal coverage with 0 dB of coverage enhancement and/or without any repetition transmission, and a plurality of different coverage enhancement levels with more than 0 dB of coverage enhancement and/or more than one time repetition transmission; or the coverage enhancement levels only comprise a plurality of different coverage enhancement levels with more than 0 dB of coverage enhancement and/or more than one time repetition transmission.

7. The method according to claim 1, wherein transmitting, by the network side, the physical downlink control channels over the frequency resources of the physical downlink control channels comprises:

transmitting, by the network side, the physical downlink control channels as Enhanced Physical Downlink Control Channels (EPDCCHs) over the frequency resources of the physical downlink control channels; and/or wherein the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs); and/or wherein the frequency resources of the physical downlink control channels comprise:

information about narrow bands in which the physical downlink control channels are transmitted, and/or information about indices of Enhanced Control Channel Elements (ECCEs) in which the physical downlink control channels are transmitted; or a common search space where the physical downlink control channels are transmitted.

8. A method for transmitting a random access response, the method comprising:

determining, by a UE, frequency resources of physical downlink control channels at least according to coverage enhancement levels corresponding to the physical downlink control channels, wherein the frequency resources of the physical downlink control channels with different coverage enhancement levels are configured independently, wherein the physical downlink control channel is used for scheduling a physical downlink shared channel carrying the random access response; and receiving, by the UE, the physical downlink control channels over the frequency resources of the physical downlink control channels.

9. The method according to claim 8, wherein before the UE determines the frequency resources of the physical downlink control channels at least according to the coverage enhancement levels corresponding to the physical downlink control channels, the method further includes:

obtaining configuration information indicating the frequency resources of the physical downlink control channels with the different coverage enhancement levels independently, and obtaining the frequency resources of the physical downlink control channels with the different coverage enhancement levels according to the configuration information.

10. The method according to claim 8, wherein if a PRACH corresponding to the coverage enhancement level has a plurality of available frequency resources in the same sub-frame, then the UE further determines a frequency resource of the physical downlink control channel according to a frequency resource for transmitting the PRACH of the UE, wherein the frequency resources of the physical downlink control channel, corresponding to the different PRACH frequency resources of the PRACH corresponding to the coverage enhancement level in the same sub-frame are configured independently.

11. The method according to claim 10, wherein before the UE determines the frequency resource of the physical downlink control channel according to the frequency resource for transmitting the PRACH of the UE, the method further includes:

obtaining configuration information indicating the frequency resources of the physical downlink control channel, corresponding to the different PRACH frequency resources of the PRACH corresponding to each coverage enhancement level in the same sub-frame independently, and obtaining the frequency resources of the physical downlink control channel, corresponding to the different PRACH frequency resources of the PRACH corresponding to each coverage enhancement level in the same sub-frame according to the configuration information.

12. The method according to claim 8, wherein the configuration information indicating the frequency resources of the physical downlink control channel is obtained via system information.

13. The method according to claim 8, wherein the coverage enhancement levels each are represented as a number of dBs of coverage enhancement and/or a number of repetition transmissions, wherein the coverage enhancement levels comprise normal coverage with 0 dB of coverage enhancement and/or without any repetition transmission, and a plurality of different coverage enhancement levels with more than 0 dB of coverage enhancement and/or more than one repetition transmission; or the coverage enhancement levels only comprise a plurality of different coverage enhancement levels with more than 0 dB of coverage enhancement and/or more than one repetition transmission.

14. The method according to claim 8, wherein receiving, by the UE, the physical downlink control channels over the frequency resources of the physical downlink control channels comprises:

receiving, by the UE, the physical downlink control channels as Enhanced Physical Downlink Control Channels (EPDCCHs) over the frequency resources of the physical downlink control channels; and/or wherein the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs); and/or wherein the frequency resources of the physical downlink control channels comprise:

information about narrow bands in which the physical downlink control channels are transmitted, and/or information about indices of Enhanced Control Channel Elements (ECCEs) in which the physical downlink control channels are transmitted; or a common search space where the physical downlink control channels are transmitted.

15. An apparatus for transmitting a random access response, the apparatus comprising a processor, a memory, and a transceiver, wherein:

the processor is configured to read and execute program in a memory:

to determine frequency resources of physical downlink control channels at least according to coverage enhancement levels corresponding to the physical downlink control channels, wherein the frequency resources of the physical downlink control channels with different coverage enhancement levels are configured independently wherein the physical downlink control channel is used for scheduling a physical downlink shared channel carrying the random access response; and to transmit the physical downlink control channels over the frequency resources of the physical downlink control channels through the transceiver.

16. The apparatus according to claim 15, wherein before the frequency resources of the physical downlink control channels are determined at least according to the coverage enhancement levels corresponding to the physical downlink control channels, the processor is further configured:

to determine the frequency resources of the physical downlink control channels with the different coverage enhancement levels respectively, and to notify a UE independently of the frequency resources of the physical downlink control channels with the different coverage enhancement levels.

17. The apparatus according to claim 15, wherein if a Physical Random Access Channel (PRACH) corresponding to the coverage enhancement level has a plurality of available frequency resources in the same sub-frame, then the processor is further configured to determine a frequency resource of the physical downlink control channel according to a frequency resource for transmitting the PRACH, wherein the frequency resources of the physical downlink control channel, corresponding to the different PRACH frequency resources of the PRACH in the same sub-frame are configured independently.

18. The apparatus according to claim 17, wherein before the frequency resources of the physical downlink control channels are determined, the processor is further configured:

for each coverage enhancement level, to determine frequency resources of the physical downlink control channel, corresponding to different PRACH frequency resources of a PRACH corresponding to the coverage enhancement level in the same sub-frame, and to notify the UE independently of the frequency resources of the physical downlink control channel, corresponding to the different PRACH frequency resources of the PRACH corresponding to the coverage enhancement level in the same sub-frame.

19. The apparatus according to claim 15, wherein the processor notifies the UE independently of the frequency resources of the physical downlink control channel via system information.

20. The apparatus according to claim 15, wherein the coverage enhancement levels each are represented as a number of dBs of coverage enhancement and/or a number of repetition transmissions, wherein the coverage enhancement levels comprise normal coverage with 0 dB of coverage enhancement and/or without any repetition transmission, and a plurality of different coverage enhancement levels with more than 0 dB of coverage enhancement and/or more than one repetition transmission; or the coverage enhancement levels only comprise a plurality of different coverage enhancement levels with more than 0 dB of coverage enhancement and/or more than one repetition transmission.

21. The apparatus according to claim 15, wherein the processor transmits the physical downlink control channels as Enhanced Physical Downlink Control Channels (EPDCCHs) over the frequency resources of the physical downlink control channels;

and/or wherein the processor transmits the physical downlink control channels in a common search space, and scrambles the physical downlink control channels using Random Access Radio Network Temporary Identifiers (RA-RNTIs), or Temporary Cell Radio Network Temporary Identifiers (TC-RNTIs), or Cell Radio Network Temporary Identifiers (C-RNTIs); and/or wherein the frequency resources of the physical downlink control channels comprise:

information about narrow bands in which the physical downlink control channels are transmitted, and/or information about indices of Enhanced Control Channel Elements (ECCEs) in which the physical downlink control channels are transmitted; or a common search space where the physical downlink control channels are transmitted.

22. An apparatus for transmitting a random access response, the apparatus comprising a processor, a memory, and a transceiver, wherein:

the processor is configured to read and execute program in a memory:

to determine frequency resources of physical downlink control channels at least according to coverage enhancement levels corresponding to the physical downlink control channels, wherein the frequency resources of the physical downlink control channels with different coverage enhancement levels are configured independently, wherein the physical downlink control channel is used for scheduling a physical downlink shared channel carrying the random access response; and to receive the physical downlink control channels over the frequency resources of the physical downlink control channels through the transceiver.

23. The apparatus according to claim 22, wherein before the frequency resources of the physical downlink control channels are determined at least according to the coverage enhancement levels corresponding to the physical downlink control channels, the processor is further configured:

to obtain configuration information indicating the frequency resources of the physical downlink control channels with the different coverage enhancement levels independently, and to obtain the frequency resources of the physical downlink control channels with the different coverage enhancement levels according to the configuration information.

24. The apparatus according to claim 22, wherein if a PRACH corresponding to the coverage enhancement level has a plurality of available frequency resources in the same sub-frame, then the processor is further configured to determine a frequency resource of the physical downlink control channel according to a frequency resource for transmitting the PRACH of a UE, wherein the frequency resources of the physical downlink control channel, corresponding to different PRACH frequency resources of the PRACH corresponding to the coverage enhancement level in the same sub-frame are configured independently.

25. The apparatus according to claim 24, wherein before the frequency resource of the physical downlink control channel are determined according to the frequency resource for transmitting the PRACH of the UE, the processor is further configured:
to obtain configuration information indicating the frequency resources of the physical downlink control channel, corresponding to the different PRACH frequency resources of the PRACH corresponding to each coverage enhancement level in the same sub-frame independently, and to obtain the frequency resources of the physical downlink control channel, corresponding to the different PRACH frequency resources of the PRACH corresponding to each coverage enhancement level in the same sub-frame according to the configuration information.

26. The apparatus according to claim 22, wherein the configuration information indicating the frequency resources of the physical downlink control channel is obtained via system information.

27. The apparatus according to claim 22, wherein the coverage enhancement levels each are represented as a number of dBs of coverage enhancement and/or a number of repetition transmissions, wherein the coverage enhancement levels comprise normal coverage with 0 dB of coverage enhancement and/or without any repetition transmission, and a plurality of different coverage enhancement levels with more than 0 dB of coverage enhancement and/or more than one repetition transmission; or the coverage enhancement levels only comprise a plurality of different coverage enhancement levels with more than 0 dB of coverage enhancement and/or more than one repetition transmission.

28. The apparatus according to claim 22, wherein the processor receives the physical downlink control channels as Enhanced Physical Downlink Control Channels (EPD-CCHs) over the frequency resources of the physical downlink control channels; and/or
wherein the physical downlink control channels are transmitted in a common search space, and the physical downlink control channels are scrambled using Random Access Radio Network Temporary Identifiers (RA-RNTIs), or Temporary Cell Radio Network Temporary Identifiers (TC-RNTIs), or Cell Radio Network Temporary Identifiers (C-RNTIs); and/or
wherein the frequency resources of the physical downlink control channels comprise:
information about narrow bands in which the physical downlink control channels are transmitted, and/or information about indices of Enhanced Control Channel Elements (ECCEs) in which the physical downlink control channels are transmitted; or a common search space where the physical downlink control channels are transmitted.

\* \* \* \* \*